Jan. 15, 1935.  L. E. PARKER  1,988,086
WHEEL GUARD
Filed April 25, 1934  2 Sheets-Sheet 1

Inventor
Lewis E. Parker.

Jan. 15, 1935.  L. E. PARKER  1,988,086
WHEEL GUARD
Filed April 25, 1934  2 Sheets-Sheet 2
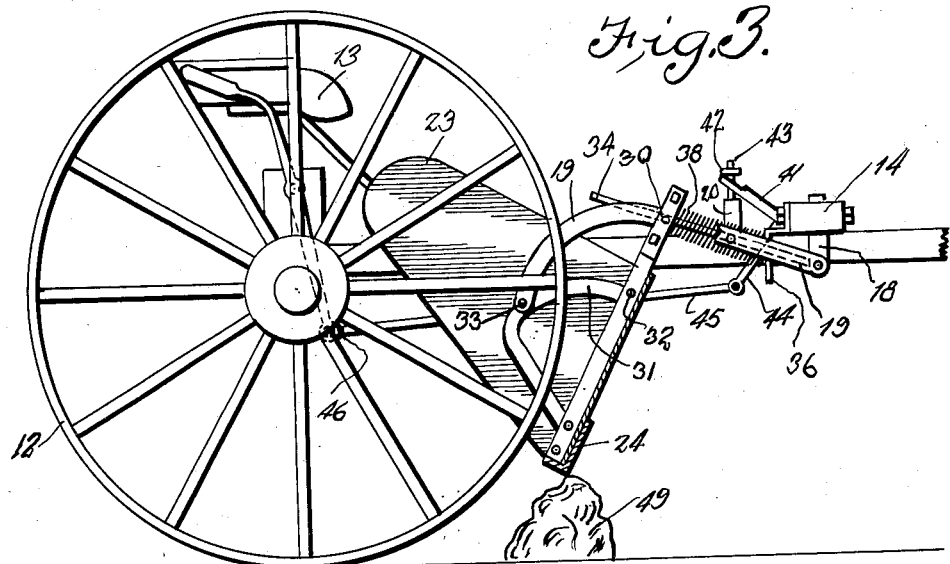
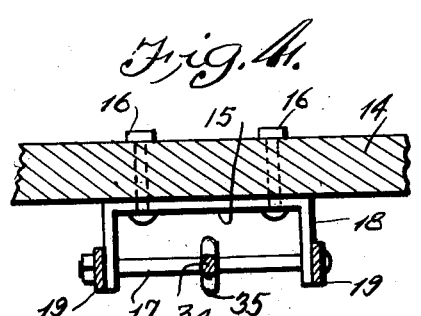
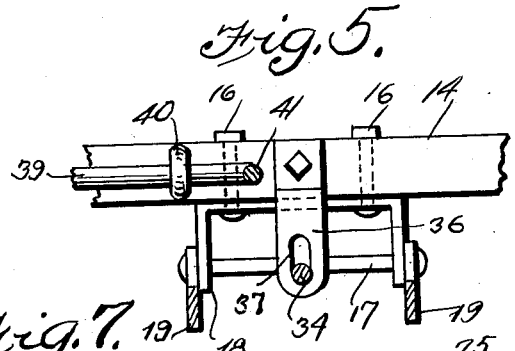
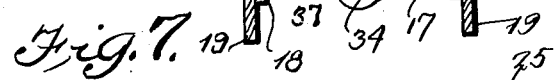
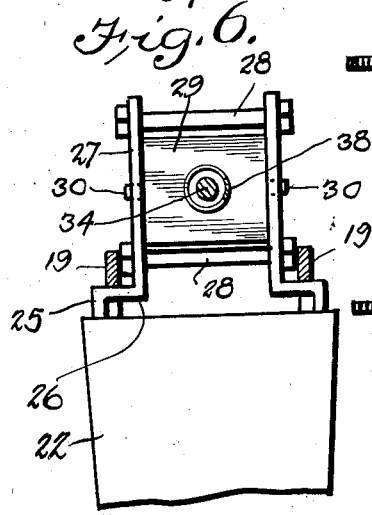
Inventor
Lewis E. Parker
By J. K. Bryant
Attorney Patented Jan. 15, 1935

1,988,086

UNITED STATES PATENT OFFICE 1,988,086

WHEEL GUARD

Lewis E. Parker, Presque Isle, Maine

Application April 25, 1934, Serial No. 722,366

6 Claims. (Cl. 280—160)

This invention relates to certain new and useful improvements in wheel guards.

The primary object of the invention is to provide a wheel guard especially designed for association with wheeled cultivators or other agricultural machinery for the protection of growing plants and to prevent entanglements of growing plants and other vegetation in the spokes of the wheels.

In the use of wheeled cultivators, it frequently occurs that growing plants become entangled with the spokes of the cultivator wheels and the plants become unearthed, and it is an object of this invention to provide a guard positioned forwardly of each ground wheel of the cultivator to prevent the growing plants from becoming entangled with the wheel spokes, the guard being of a character for the escape of ground obstructions, such for instance as stones or the like to prevent injury thereto and also capable of being manually elevated when desired.

With the above and other objects in view that will become apparent as the nature of the invention is better understood, the same consists in the novel form, combination and arrangement of parts hereinafter more fully described, shown in the accompanying drawings and claimed.

In the drawings:—

Figure 3 is a fragmentary side elevational view, similar to Figure 1, with the wheel guards shown in section and in an elevated position, being so moved by a ground obstruction;

Figure 4 is a detail sectional view taken on line 4—4 of Figure 1;

Figure 5 is a detail sectional view taken on line 5—5 of Figure 1;

Figure 6 is a detail sectional view taken on line 6—6 of Figure 1; and

Figure 7 is a detail sectional view taken on line 7—7 of Figure 1.

Figure 1:
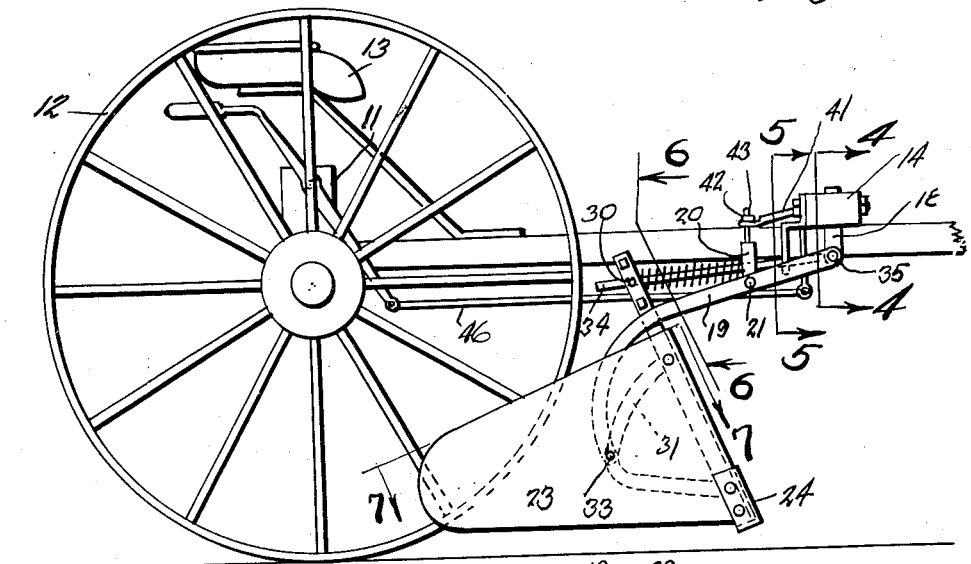
Figure 1 is a fragmentary side elevational view of a wheeled cultivator constructed in accordance with the present invention, showing the tensioned wheel guards in position.
Figure 2:
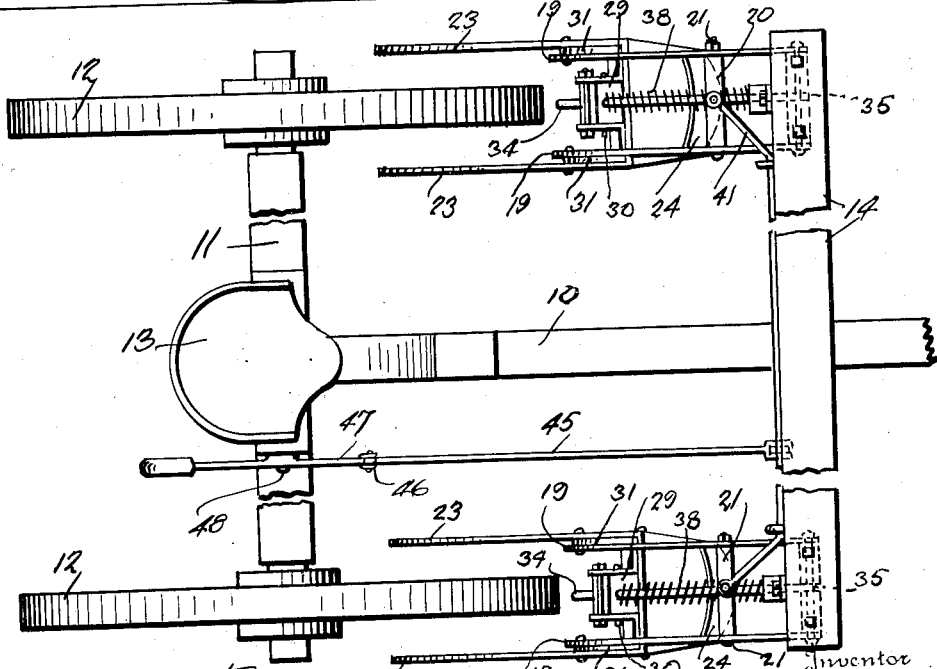
Figure 2 is a fragmentary top plan view showing a guard associated with each wheel of the cultivator.

It is to be understood that the wheel guard may be associated with any type of agricultural machinery desired and the wheel guard will be herein described as associated with a wheeled cultivator. As fragmentarily illustrated, the cultivator comprises a draft bar 10 carrying a transverse axle bar 11 with the ground wheel 12 upon each end thereof, the draft bar 10 supporting the operator's seat 13 as shown in Figures 1 and 2.

A guard is associated with the forward side of each wheel 12 and the guards are supported on the ends of the transverse bar 14 carried by the draft bar 10 forwardly of the wheels 12. Each wheel guard and its mounting, as shown more clearly in Figures 4 and 5, includes an inverted U-shaped strap having the base portion 15 anchored as at 16 to the underside of the transverse bar 14 forwardly of its associated wheels 12 and having a pivot cross rod 17 mounted in the lower end of the side arms 18 of the inverted U-shaped strap, and said cross rod 17 has pivotally mounted on each end thereof outwardly of the side arms 18 of the strap, a downwardly arched lever 19. The levers 19 are connected together by an upwardly arched brace 20 intermediate the ends thereof and in proximity of the cross rod 17, the connection including pivot pins 21.

The guard per se is of U-shape in plan view as shown in Figure 7 and includes a front cross wall 22 and side wings 23, the front cross wall 22 being reinforced at its lower edge by a toe plate 24. A strap iron 25 is secured to the inner side of each wing 23 adjacent the front cross wall 22 with the upper ends of the strap iron offset in directions toward each other as at 26 and shown in Figure 6 as continuing upwardly as side bars 27 connected together by cross bolts 28 spaced from each other. For purposes presently to appear, a block 29 is pivotally supported as at 30 between the upper side bars 27 of the strap irons 25 between the connecting bolts 28. A curved link member 31 is secured at its ends as at 32 to each strap iron 25 and the rear free ends of the levers 19 are pivotally connected to the curved links 31 intermediate their ends as at 33, the downwardly arched levers 19 extending over the upper end of the wheel guard as shown in Figures 1 and 3, and in engagement with the offset shoulders 26 as shown in Figure 6 for limiting downward movement of the wheel guard.

The mounting for the guard includes a tensioned element in the form of a rod 34 slidable through a central opening in the pivoted block 29 carried by the upper ends 27 of the strap irons 25 with the other end of the rods 34 connected as at 35 to the cross rod 17 intermediate its end. A strap iron 36 is secured to and depends from the transverse bar 14 and is slotted as at 37 for the passage of the rod 34 to provide a guard therefor and said rod 34 is surrounded by a coil spring 38 positioned between the strap iron 36 and block 29 and engaged at its ends therewith.

A cross rod 39 is journalled by means of bearings 40 to the rear side of the transverse bar 14, each end of the rod 39 carrying an angularly directed arm 41 that is engaged with the underside of a nut 42 adjustably threaded upon the upper end of a pin 43 rising centrally from the upwardly arched brace 20. An arm 44 extends from the rod 39 and is pivotally connected at its lower end to a link rod 45, the other end of which is pivoted as at 46 to the lower end of the hand lever 47 that in turn is pivotally mounted as at 48 upon the axle bar 11 adjacent the operator's seat 13.

The normal position of the wheel guard is shown in Figure 1, as being positioned forwardly of the wheel 12 adjacent the ground line with the side wings 23 of the guard straddling the forward side of the wheel to provide growing plants and the like from becoming entangled with the spokes of the wheels. Should an obstruction be encountered, such as indicated at 49 in Figure 3, the guard is swung in an upward arcuate direction on the pivot levers 19 and the guards are tensioned during such movement by pivotal movements on the connections 33 between the levers 19 and curved links 31, this movement being tensioned by the springs 38, the block 29 carried by the upper end of the guard moving against the spring 38 with the rod 34 moving through the block 29. The guards are also elevated manually by means of the hand lever 47, elevation of the rear end of the lever 47 rotating the rod 39 for causing the arms 41 carried thereby and engaged with the cross brace 20 to elevate the latter and guard member, the arms 41 being illustrated in their elevated positions with the guards raised in Figure 3.

From the above detailed description of the invention, it is believed that the construction and operation thereof will at once be apparent, and while there is herein shown and described the preferred embodiment, it is nevertheless to be understood that minor changes may be made therein without departing from the spirit and scope of the invention as claimed.

I claim:—

1. In a wheel guard for agricultural machinery having ground wheels, a guard pivotally supported forwardly of each wheel having side wings straddling the wheel, the guard support including a pair of spaced levers pivoted at opposite ends to the machine and guard respectively, said guard and levers cooperating to limit downward pivotal movement of the guard and means for tensioning upward pivotal movement of the guard.

2. In a wheel guard for agricultural machinery having ground wheels, a guard pivotally supported forwardly of each wheel having side wings straddling the wheel, the guard support including a pair of spaced levers pivoted at opposite ends to the machine and guard respectively, said guard and levers cooperating to limit downward pivotal movement of the guard, means for tensioning upward pivotal movement of the guard, and means for manually moving the guards upwardly on said pivots.

3. In a wheel guard for agricultural machinery having ground wheels, a guard pivotally supported forwardly of each wheel having side wings straddling the wheel, the guard support including a pair of spaced levers pivoted at opposite ends to the machine and guard respectively, said guard and levers cooperating to limit downward pivotal movement of the guard, means for tensioning upward pivotal movement of the guard including a rod pivoted at one end on the machine with its other end slidable through an upper portion of the guard and a coil spring interposed between the guard and rod pivot.

4. In a wheel guard for agricultural machinery having ground wheels, a guard pivotally supported forwardly of each wheel having side wings straddling the wheel, the guard support including a pair of spaced levers pivoted at opposite ends to the machine and guard respectively, said guard and levers cooperating to limit downward pivotal movement of the guard, means for tensioning upward pivotal movement of the guard including a rod pivoted at one end on the machine with its other end slidable through an upper portion of the guard, a coil spring interposed between the guard and rod pivot and means for manually moving the guards upwardly on their pivotal mountings.

5. In a wheel guard for agricultural machinery having ground wheels, a guard pivotally supported forwardly of each wheel having side wings straddling the wheel, the guard support including a pair of spaced levers pivoted at opposite ends to the machine and guard respectively, said guard and levers cooperating to limit downward pivotal movement of the guard, a rod pivoted at one end on the machine with its other end slidable through an upper portion of the guard, a coil spring interposed between the guard and rod pivot and a slotted strap through which the rod extends for guiding pivotal movements of said rod and limiting downward pivotal movement of the guard.

6. In a wheel guard for agricultural machinery having ground wheels, a guard pivotally supported forwardly of each wheel having side wings straddling the wheel, the guard support including a pair of spaced levers pivoted at opposite ends to the machine and guard respectively, said guard and levers cooperating to limit downward pivotal movement of the guard, means for tensioning upward pivotal movement of the guard including a rod pivoted at one end on the machine with its other end slidable through an upper portion of the guard, a coil spring interposed between the guard and rod pivot, means for manually moving the guards upwardly on their pivotal mountings, and a slotted strap through which the rod extends for guiding pivtotal movements of the rod and limiting downward pivotal movement of the guard.

LEWIS E. PARKER.